US010162870B2

(12) United States Patent
Bostick et al.

(10) Patent No.: US 10,162,870 B2
(45) Date of Patent: Dec. 25, 2018

(54) HISTORICAL SUMMARY VISUALIZER FOR NEWS EVENTS

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Sarbajit K. Rakshit, Kolkata (IN); Kimberly G. Starks, Nashville, TN (US)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 14/870,161

(22) Filed: Sep. 30, 2015

(65) Prior Publication Data

US 2017/0091291 A1    Mar. 30, 2017

(51) Int. Cl.
*G06F 17/30* (2006.01)
*G06F 3/0484* (2013.01)
*G06T 11/20* (2006.01)
*G06F 17/22* (2006.01)
(Continued)

(52) U.S. Cl.
CPC ...... *G06F 17/30554* (2013.01); *G06F 3/0482* (2013.01); *G06F 3/04842* (2013.01); *G06F 3/167* (2013.01); *G06F 17/2235* (2013.01); *G06F 17/3087* (2013.01);
(Continued)

(58) Field of Classification Search
None
See application file for complete search history.

(56) References Cited

U.S. PATENT DOCUMENTS

| 8,516,374 B2 | 8/2013 | Fleischman et al. |
| 8,782,043 B2 | 7/2014 | Chisholm et al. |
| 8,826,125 B2 | 9/2014 | Chu |

(Continued)

FOREIGN PATENT DOCUMENTS

CN    102646114 A    8/2012

OTHER PUBLICATIONS

Po Hu et al, Generating Breakpoint-based Timeline Overview for News Topic Retrospection, 2011 11th IEEE International Conference on Data Mining, 2014.

(Continued)

*Primary Examiner* — Syling Yen
*Assistant Examiner* — Soheila (Gina) Davanlou
(74) *Attorney, Agent, or Firm* — Patrick J. Daugherty; Daugherty & Del Zoppo Co., LPA (57) ABSTRACT

Aspects generate an interactive plotted electronic map presentation which depicts historical progression of events of a news story. Historical news content stories are searched for and retrieved from one or more news media sources as a function of including a common key perspective topic, and of association with an incident geographic location and occurrence time. A graphical user interface display device is driven to indicate on a map of geographic locations a location of an initial event of the historical news content that has an earliest time of occurrence relative to the news story incident and other events, and to plot a time line curve from a point of origin at the mapped initial event location as a function of a relation over time of the total numbers of the historical news content stories to respective times of publication.

20 Claims, 5 Drawing Sheets

(51) Int. Cl.
*G06F 3/16* (2006.01)
*G06F 3/0482* (2013.01)

(52) U.S. Cl.
CPC .... *G06F 17/3089* (2013.01); *G06F 17/30241* (2013.01); *G06T 11/206* (2013.01)

(56) References Cited

U.S. PATENT DOCUMENTS

| | | |
|---|---|---|
| 8,849,809 B1 | 9/2014 | Seshadri |
| 9,760,636 B1* | 9/2017 | Bharat ................ G06F 17/3071 |
| 2008/0294663 A1 | 11/2008 | Heinley et al. |
| 2011/0072466 A1 | 3/2011 | Basso et al. |
| 2013/0086501 A1 | 4/2013 | Chow et al. |
| 2013/0157234 A1 | 6/2013 | Gulli et al. |
| 2013/0191388 A1* | 7/2013 | Bernhardt ......... G06F 17/30864 707/737 |
| 2014/0172818 A1 | 6/2014 | Bennett |
| 2014/0250136 A1 | 9/2014 | Piantino et al. |
| 2015/0317655 A1* | 11/2015 | Myers ................ G06Q 30/0205 705/7.34 |
| 2016/0048556 A1* | 2/2016 | Kelly ................ G06F 17/30867 707/767 |

OTHER PUBLICATIONS

Eugene-Woo, Create Your Own Ebola Infographics and Charts, Venngage.com, 2014.
Tyler Hayes, This Innovative, On-Demand Radio App Could Change News, Co. Labs, 2015.
Earl J. Wagner et al, Anchoring News Events in Time, ACM, 2004.
Russell Swan et al, Automatic Generation of Overview Timelines, Center for Intelligent Information Retrieval, University of Massachusetts, ACM, 2000.
Peter Mell et al, The NIST Defination of Cloud Computing, National Institute of Standards and Technology, Publication 800-145, 2011.

* cited by examiner

HISTORICAL SUMMARY VISUALIZER FOR NEWS EVENTS

BACKGROUND

People around the world watch a variety of news and television (TV) programs (telecast content) that include content on business, politics, sports, entertainment, travel, etc. There are many different service providers of news and broadcasting of programs in a variety of different media as well, including streaming video/audio content accessed via internet browsers, web text content, radio, print media, etc., and any may be produced from a wide range of private and public outlet sources and entities.

Different telecasts covering the same news story about a particular incident or a topic thereof may be individually produced and broadcast at different times over a given time period. Updates to a story or related topic may be generated by any given broadcast entity on a regular basis over one or more time periods, for example daily, weekly, monthly or over longer periods of time.

SUMMARY

In one aspect of the present invention, a method for generating an interactive plotted electronic map presentation which depicts historical progression of events of a news story includes a processor, in response to a selection of a news story, identifying a key perspective topic of the news story, a geographic location of an occurrence of an incident of the news story, and a time of the incident occurrence. The method includes searching for and retrieving from one or more news media sources historical news content stories as a function of each of the retrieved stories including the key perspective topic and association with the incident geographic location and occurrence time. The retrieved historical content also includes context data that comprehends times of publication of each of the retrieved stories and geographic location data of occurrences of events within the retrieved content. Total numbers of the historical news content stories are determined with respect to times of publication. Thus, a graphical user interface display device is driven to indicate on a map of geographic locations a location of an initial event of the historical news content that has an earliest time of occurrence relative to the news story incident and other events, and to plot a time line curve from a point of origin at the mapped initial event location as a function of a relation over time of the total numbers of the historical news content stories to respective times of publication.

In another aspect, a system has a hardware processor in circuit communication with a computer readable memory and a computer-readable storage medium having program instructions stored thereon. The processor executes the program instructions stored on the computer-readable storage medium via the computer readable memory and thereby, in response to a selection of a news story, identifies a key perspective topic of the news story, a geographic location of an occurrence of an incident of the news story, and a time of the incident occurrence. Historical news content stories are searched for and retrieved from one or more news media sources as a function of each of the retrieved stories including the key perspective topic and association with the incident geographic location and occurrence time. The retrieved historical content also includes context data that comprehends times of publication of each of the retrieved stories and geographic location data of occurrences of events within the retrieved content. Total numbers of the historical news content stories are determined with respect to times of publication. Thus, a graphical user interface display device is driven to indicate on a map of geographic locations a location of an initial event of the historical news content that has an earliest time of occurrence relative to the news story incident and other events, and to plot a time line curve from a point of origin at the mapped initial event location as a function of a relation over time of the total numbers of the historical news content stories to respective times of publication.

In another aspect, a computer program product for generating an interactive plotted electronic map presentation which depicts historical progression of events of a news story incident as a function of topic has a computer-readable storage medium with computer readable program code embodied therewith. The computer readable program code includes instructions for execution which cause the processor to, in response to a selection of a news story, identifies a key perspective topic of the news story, a geographic location of an occurrence of an incident of the news story, and a time of the incident occurrence. Historical news content stories are searched for and retrieved from one or more news media sources as a function of each of the retrieved stories including the key perspective topic and association with the incident geographic location and occurrence time. The retrieved historical content also includes context data that comprehends times of publication of each of the retrieved stories and geographic location data of occurrences of events within the retrieved content. Total numbers of the historical news content stories are determined with respect to times of publication. Thus, a graphical user interface display device is driven to indicate on a map of geographic locations a location of an initial event of the historical news content that has an earliest time of occurrence relative to the news story incident and other events, and to plot a time line curve from a point of origin at the mapped initial event location as a function of a relation over time of the total numbers of the historical news content stories to respective times of publication.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
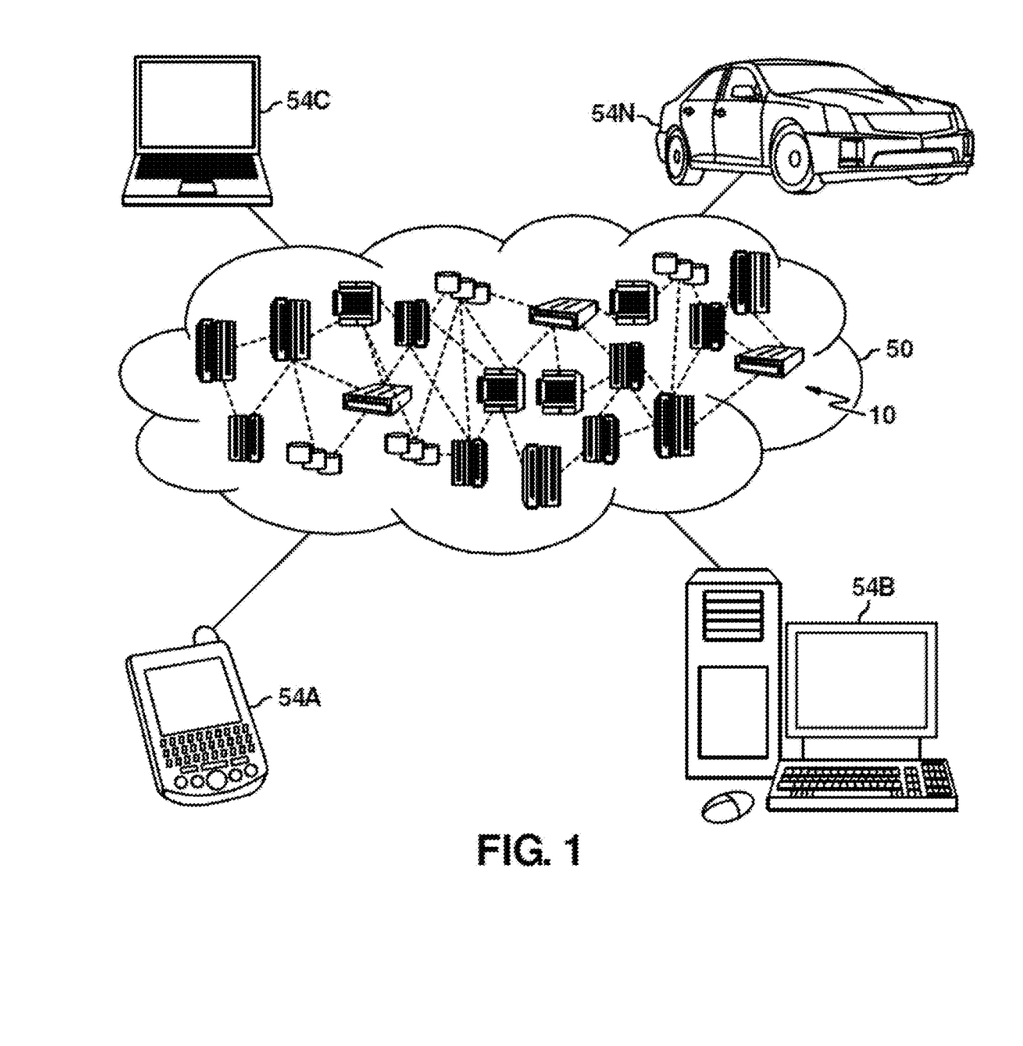
FIG. 1 depicts a cloud computing environment according to an embodiment of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
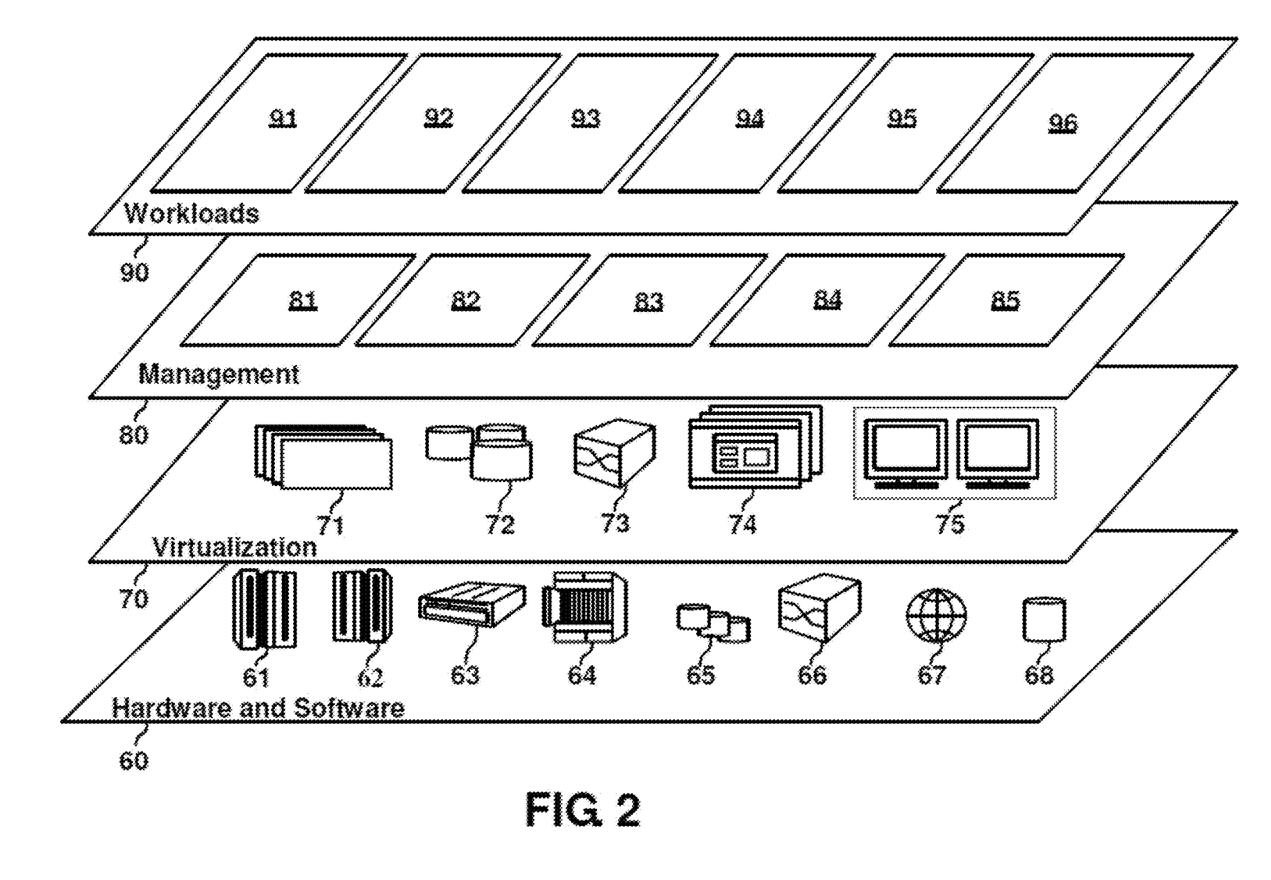
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for generating an interactive plotted electronic map presentation which depicts historical progression of events of a news story.

Figure 3:
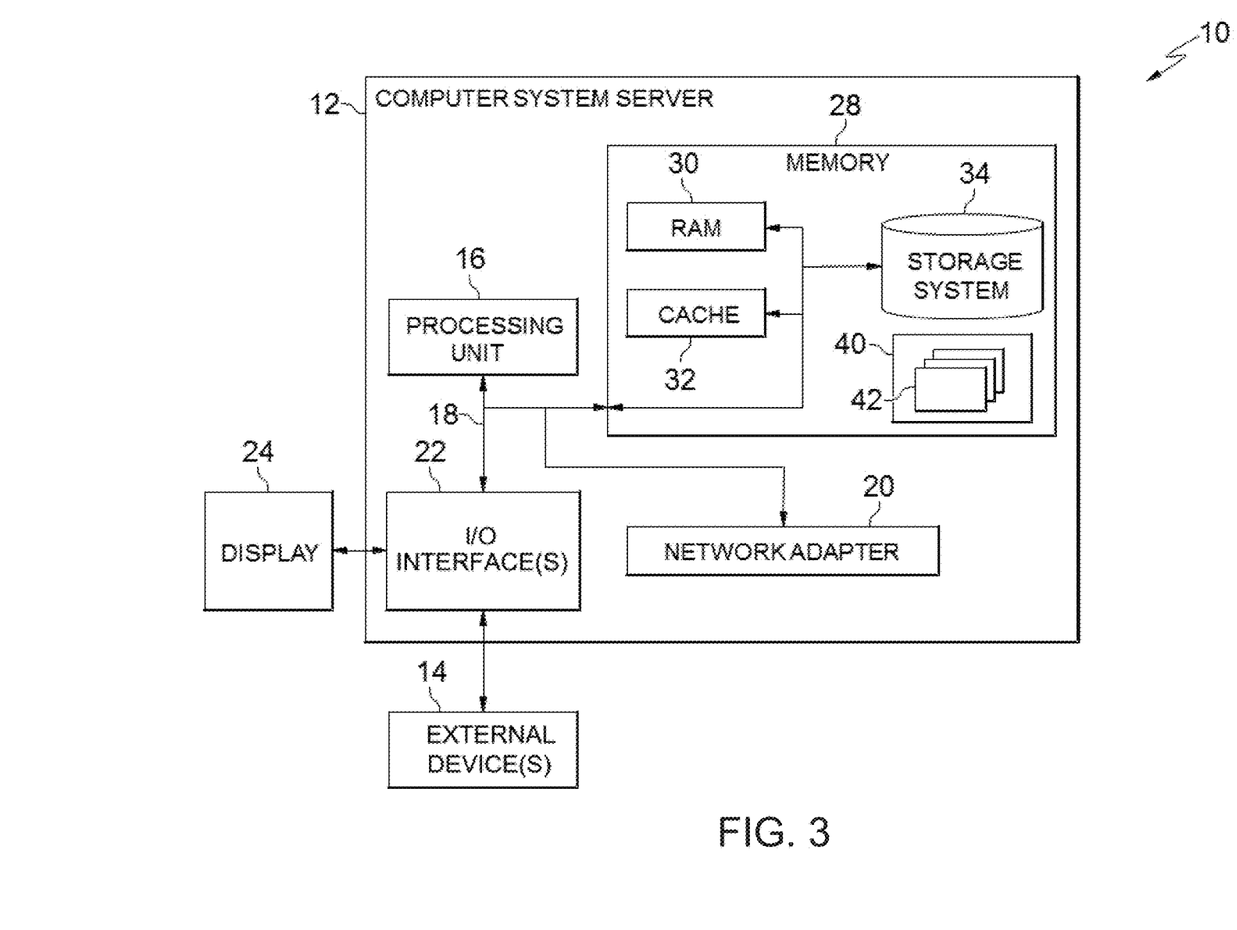
FIG. 3 depicts a programmable device implementation according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
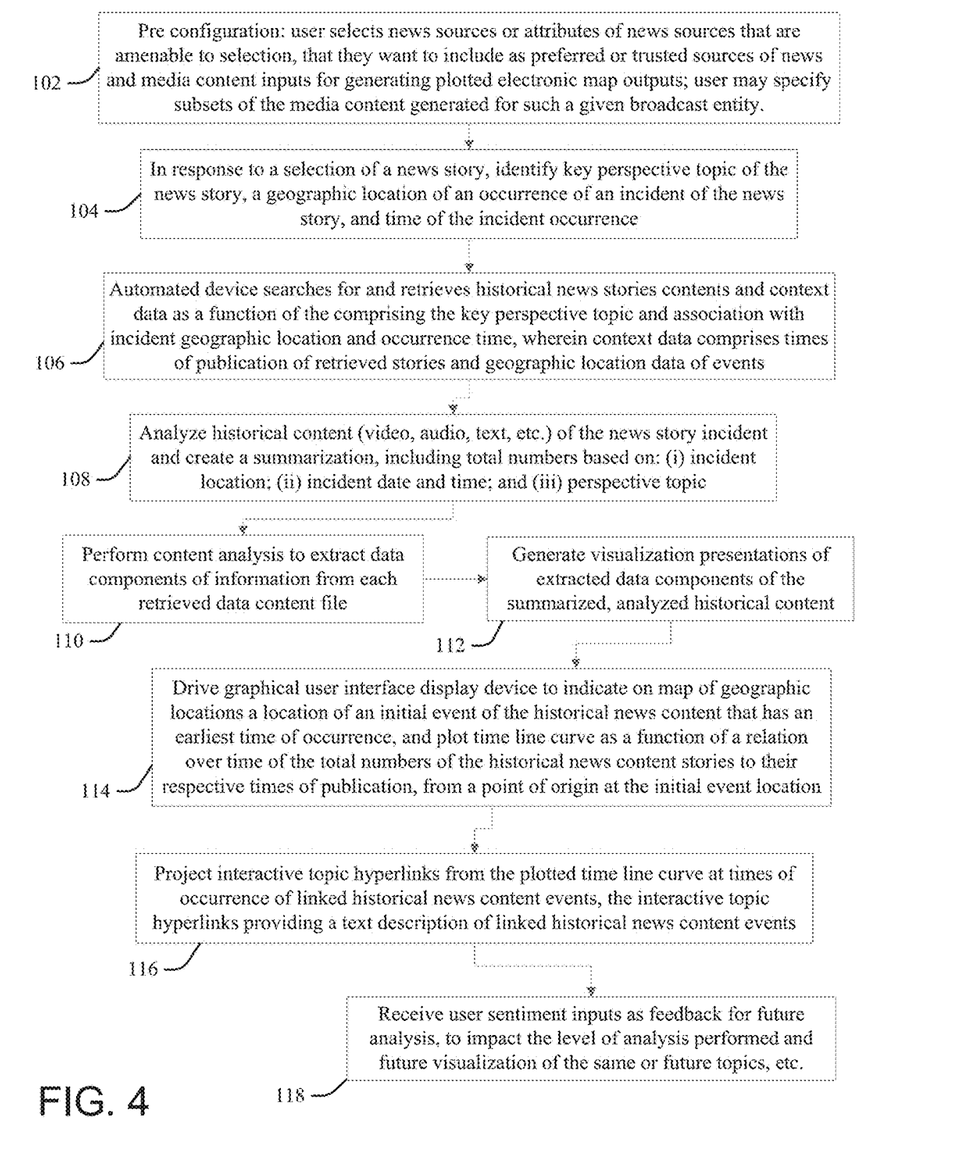
FIG. 4 is a flow chart illustration of a method or process according to an embodiment of the present invention for generating an interactive plotted electronic map presentation which depicts historical progression of events of a news story.

FIG. 4 (or "FIG. 4") illustrates a computer implemented method or process of an aspect of the present invention wherein a processor (for example, a central processing unit (CPU)) executes code (for example, code installed on a storage device in communication with the processor) and thereby generates a plotted electronic map which depicts historical progression of events of a news topic, via at least geolocation and temporal analysis of news item content.

At 102, in a "pre configuration" step a user selects news sources or attributes of news sources that are amenable to selection, that they want to include as preferred or trusted sources of news and media content inputs for generating plotted electronic map outputs. Some news sources may have multi-channel media content (for example, a given "trusted" or otherwise selected governmental or private media organization may have print and web text content stories with and without photographs, as well as radio and TV audio and video broadcast news story segments, and the user may specify subsets of the media content generated for such a given broadcast entity (for example, only text, or only multi-media content, etc.).

Attributes of news sources that are amenable to selection may include general political perspective (liberal/left-leaning or conservative/right leaning editorial bias of the source), correlation with personal beliefs (for example, alignment with religion or philosophy of the user), or other perspective definition (content written by celebrity or well-known cultural figures and writers, or by people within a social media universe, such as by people followed on Twitter®, Facebook® or LinkedIn®, or by general public wiki sources, etc.). (TWITTER is a trademark of Twitter, Inc. in the United States or other countries; FACEBOOK is a trademark of Facebook, Inc. in the United States or other countries; LINKEDIN is a trademark of the Linkedin Corporation in the United States or other countries.) Thus, a user may define at 102 the types of content to consider as inputs classified at to the nature of the production of the content video, audio, web, etc.), as well as to the likely content of the information itself (political or philosophical or religious perspective and analysis, etc.)

At 104, in response to a selection of a news story item, the processes identifies a key perspective topic of the news story (what happened), a geographic location of an occurrence of an incident of the news story (the "place" that it happened), and temporal (time and date) data spanning the occurrence of what happened at said place (the "time" that it happened). The selection is accomplished at 104 via a Smart TV, set top box application or other automated graphical user interface (GUI) display device input selection of a news story publication about the input incident that is published by a content provider on the respective displaying Smart TV or GUI display device. Other content delivery formats may serve as a basis for implementation in other examples: for example, in response to a story read on a browser application, or a "tweet" received on a TWITTER feed, a post on a FACEBOOK posting, etc. The search may be initiated by the user watching a news story on TV or from Web browser search or from within an application ("app") that is executing on the smart TV.

A "news story" refers to a generic description or organizing narrative associated with incidents and events within news media sources as a function of sharing common event topic, place and time attributes, wherein a combination of these attributes distinctive and thereby distinguishing from topic, place or time of other news stories and their associated incidents and events. For example, an input incident of a story about a "volcanic eruption in Iceland in 2012" is distinct from the incidents and events of other stories that are not about the key perspective topic of volcanic eruptions, that did not occur in Iceland, in 2012, or are missing one of the combination of the three attributes of topic, place and time. This attribute combination thus distinguishes content relevant to the present news story input incident from stories of other Icelandic volcanic eruption stories that occurred in different years, other volcanic eruption Icelandic stories that occurred in the same year but not in Iceland, etc.

At 106 the aspect automated device searches for and retrieves historical content that includes a plurality of different news stories of events that include or are associated with the news story incident key perspective topic, place and time; and context data that includes temporal (time and date) data for each story in the retrieved historical content, as well as geographic locations for events within the retrieved historical content that differ from the input incident news story as to event description. Geographic location or temporal data of the historic data events may differ from that of the input news story incident, but the news content of the retrieved events shares or is otherwise associated with the common (same) key perspective topic of the story incident.

In some aspects the historical content and context data is retrieved from a plurality of other news service providers that are different from the content provider that published the news story publication about the incident selected at 104, thereby acquiring at 106 a wide variety of different historical news data content and context data delivered on the same news story incident from across a variety of different, other media outlets. This search may be limited to those sources that are identified, specified, filtered or preferred, or have the attributes of news sources that are amenable to selection, via the pre-configuration step 102.

Content retrieved via searching at 104 and 106 includes text news stories from print media companies, video from news organizations and social media, photographs, radio and podcast stories, etc., and may be stored to storage media (for example, a digital video recorder (DVR), a hard drive, a cloud storage folder, etc.) for archival purposes or for later viewing or listening, or if available it may be streamed to video or audio the content applications, or links to servers hosting such content may be generated for subsequent use and reference.

At 108 the aspect device analyzes the retrieved historical content (video, audio, text, etc.) creates a summarization of the analyzed, historical content (video, text, etc.) as a function of the key perspective topic and the temporal context data. The summarization may aggregate, determine total relative numbers or otherwise organize and analyze the content as a function of (i) news story incident and event location data; (ii) news story incident and event date and time data; and (iii) key perspective topic or other topic featured or otherwise included within the contents of the news story incident and the retrieved historical data events (for example, impacted people, severity of event from micro or macroeconomics at local, national or international perspective, etc.)

At 110 the aspect performs content analysis to extract data components of information from data content files from news stories retrieved at 106 as published by media companies and public sources (blogs, social media, podcast, etc.)

and including text and image objects, video files spoken word content, sound content, etc. The extraction may be a function of the presence of single or combinations of key perspective topic keywords within text and other metadata off the extracted data content, for example, satisfying a Boolean statement of "Iceland AND eruption AND 2012 AND volcanic OR volcano, and still other matching criteria will be apparent to one skilled in the art.

At 112 the aspect generates visualization presentations of extracted data components of the summarized, analyzed historical content, on a push basis or automatic basis, or on-demand in response to inputs from the user, wherein aspects may monitor news topics and create historical charts automatically or on demand. Accordingly, at 114 a graphical format summary presentation is generated on a graphical user interface display device that indicate on map of geographic locations a location of an initial event of the historical news content that has an earliest time of occurrence, and a time line curve is plotted as a function of a relation over time of the total numbers of the historical news content stories to their respective times of publication, from a point of origin at the initial event location.

At 116 one or more interactive topic hyperlinks are projected from the plotted time line curve at times of occurrence of respective linked historical news content events, as a function of a relation over time to their respective times of publication. The interactive topic hyperlinks provide a text description of linked historical news content events. The generated time line curve or graph displays summarized total numbers of the historical news content stories of the extracted data (numbers of hits on web page of one or more content providers, total number of stories published on the web or broadcast on TV or radio, or both). This structure enables a user to retrieve and view any of the linked historical news content via selection of the respective, projected hyperlinks, enabling user to advance through the as a function of time, such as by selecting multiple hyperlinks by order of time along the plotted time line curve.

Visualization presentment at 114 and 116 may be on a variety of display devices driven by or in communication with smart TV set top boxes, personal computers, mobile devices (smart phone, tablet, etc.), augmented reality glasses, and still other suitable streaming media devices will be apparent to one skilled in the art. Some aspects may also provide a slider (not shown) that enables or displays hyperlinks or other extracted historical content as a function of a slider scale, for example along a time scale of minutes, days, months, etc., along a date range of the story or key topics or events thereof. The user is thus enabled to traverse key events of the story, interact with the summary data to get additional detail via drill down to get to detailed information in different media forms (for example, TV, web, audio, etc.), in some examples based on the Pre-configuration preferences at 102. For example, per the user's configuration at 102 a TV Set-Top-Box delivers a historical TV news summary to the user, on demand or by pre-configuration, to a specified device or device list, and creates an overlay of the content on the television screen.

At 118 user sentiment inputs are received as feedback for future analysis. The user may have the option to provide sentiment or feedback comments on the summary of historical TV news content to impact the level of analysis performed, and to impact future visualization of the same or future topics.

Aspects automatically generate a visualization based on news media content and update the visualization based on new reports. User feedback at 118 improves the learning of the visualization created in order to adapt the visualization to the likes or preferences of the user.

Aspects benefit users as a way to summarize news events, and enable users to selectively follow or take along news summaries for viewing on mobile device displays, without viewing all news related to a topic. Aspects also benefit content providers (cable providers, internet service providers, etc.) who provide in home or online services to allow summarization of news topic on behalf of a user, wherein said providers may charging a subscription fee to the users of the service.

Figure 5:
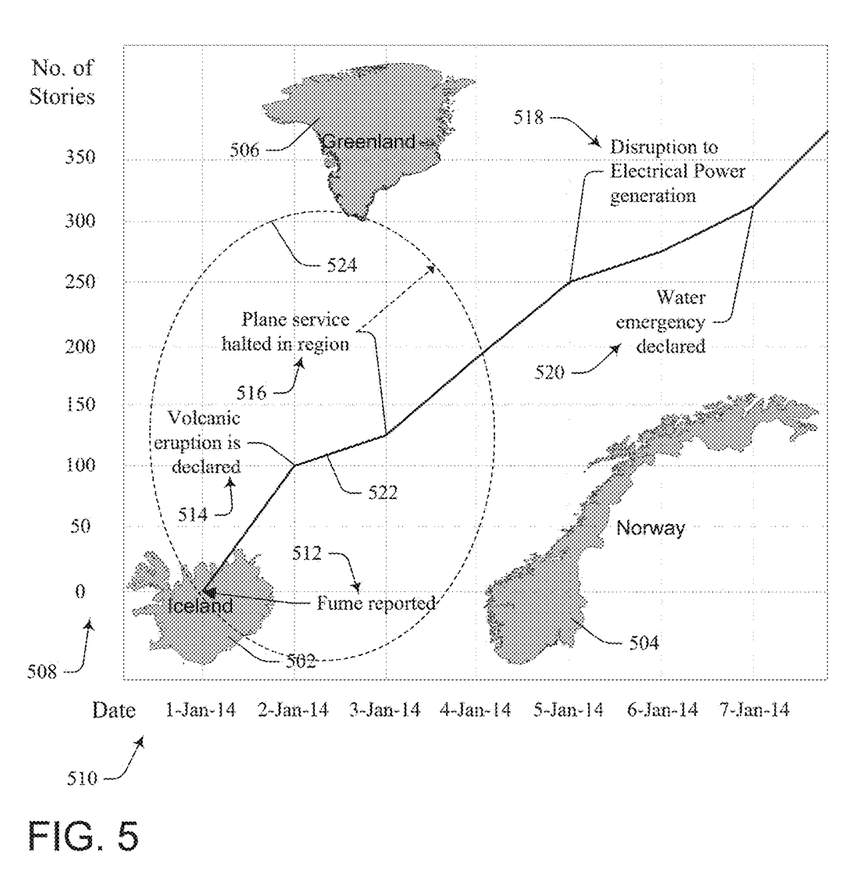
FIG. 5 is a graphic illustration of an example of an interactive plotted electronic map presentation according to an embodiment of the present invention.

FIG. 5 illustrates an example of an interactive plotted electronic map presentation generated by the process or system of FIG. 4 presenting an evolving progression of information with respect to news reporting about a news story incident of a volcanic eruption occurring at a specific location in Iceland. The map depicts the national location of the event (Iceland 502) in a scale relation to neighboring nations (for simplicity and clarity only Greenland 506 and Norway 504 are depicted, though other nations (not shown) may be added to the view, or one of Greenland 506 and Norway 504 dropped in other examples).

The first news report of the eruption event, the initial event that has an earliest time of occurrence relative to times of all others of the historical news content events and the input news story incident, was the reporting of a fume coming from the location of the Volcano, which is represented by a "Fume reported" hyperlink 512 that has an arrow pointer terminating at the location of the volcano within the scale representation of Iceland 502, plotting the location of this event of the story on the map display (see element 114 of FIG. 4 and the discussions thereof). Accordingly, this location serves as the point of origin for a graph presentation with axes of total number of stories axis 508 and date axis 510. Thus the number of stories axis 508 is initialized to zero at this location, and the date axis 510 is initialized with the date of the report (Jan. 1, 2014).

Plotted against the number of stories axis 508 and date axis 510 is a curve 522 that conveys a running tally of a number of news stories about the incident that are produced, and broadcast or otherwise generated from a universe of news sources, as a function of time and date. Thus the curve 522 conveys that at 12:01 AM on Jan. 2, 2014, there were 100 total stories about the news story incident. In some examples the universe of news sources is defined by the user at 102 of FIG. 4, so that only news sources deemed credible or likely of interest to the user are considered.

A plurality of interactive topic hyperlinks 512-514-516-518-520 are presented (pursuant to element 116 of the process/system of FIG. 4) that project from the curve 522, each indicating different key topics or events of the story, their positions along the curve 522 indicating the date and time of their first occurrence, as well as the running total number of stories reported at that time. By selecting any one of the hyperlinks 512-514-516-518-520 via a GUI routine (mouse cursor movement and click, finger touch on a smart glass display, etc.), the user triggers the presentation of extracted data components of the summarized, analyzed historical content (generated at 112, FIG. 4), enabling the user to thereby advance the story, traverse key events of the story, get additional detail, and or drill down to detailed information in different media forms, based on pre-configuration preferences at 102 (see element 116, FIG. 4).

The presentation of FIG. 5 conveys a historical progression of different topics or events as a function of both the running tally of the number of stories about the incident and their respective times of occurrence. Thus on the first day of the event (January 1, or "Day 1" in an alternate axis scale, not shown in this view), a news outlet broadcasts a story about fumes that were observed by eye witnesses, which is indicated by hyperlink text 512. On the next day (January 2, or Day 2) a feature story on lava coming out of the volcano is broadcast, indicating the first date of eruption, as is indicated by hyperlink text 514.

Aspects may also plot the locations of other events of the story on the map display, in combination with plotting their respective times of occurrence on the time line curve 522. For example, hyperlink text 516 projects from the time curve 522 (and thus occurred on) January 3 (or Day 3 relative to the initial day), and links to another broadcast story of the historical content that focuses on impact to people as the lead story on a key topic of the eruption (defined by the user pre-configuration at 102, FIG. 4): plane service is halted in an airspace of a region encompassing the erupting volcano and that is defined by a dotted line 524 as plotted on the map 510 and linked to said hyperlink text 516. Selecting the hyperlink 516 triggers presentment of linked new content that describe economic impacts on multiple scales (geographic and political), for example, as extracted from the historical content at 112.

Thus, a user watching TV news content seven days after commencement of the event, for example, on January 7, or Day 7, or later, is presented with the current view, providing a summary of the historical news relative to different given topics indicated by the respective hyperlinks 512-514-516-518-520, for example on the user's mobile device screen. The summary report is interactive, enabling the user to drill up or down into the summary report to get more details about the news events. The summary report can also be redrawn and visualized with respect to different user-selected (or default) axes: for example, redrawn to provide topic hyperlinks from only one or subsets of news sources selected from the universe used to generate the display of FIG. 5, wherein a different set of hyperlinks (not shown) may be plotted on the curve 522.

Thus, aspects provide for systems, methods and applications that a user can use to search for a news story or event and have the content across various media types (TV broadcast and stream, web, etc.) aggregated in summary form for a user to visualize on an electronic map for location context with links to detail information. Aspects enable users to gain insight to progression of a story in aggregated form over time period with on-demand capability.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating an interactive plotted electronic map presentation which depicts historical progression of events of a news story, the method comprising executing on a computer processor:

in response to a selection of a news story, identifying a key perspective topic of the news story, a geographic location of an occurrence of an incident of the news story, and a time of the incident occurrence;

searching for and retrieving from at least one news media source a plurality of historical news content stories as a function of each of the retrieved historical content news stories comprising the key perspective topic and an association with the incident geographic location and the incident occurrence time, and wherein the retrieved historical content comprises context data that comprises times of publication of each of the retrieved stories and geographic location data of occurrences of events within the retrieved historical content;

determining a plurality of total numbers of the historical news content stories with respect to each of plurality of different times of publication of the respective historical news content stories;

driving a graphical user interface display device to indicate on a map of geographic locations a location of an initial event of the historical news content that has an earliest time of occurrence relative to occurrence times of others of the historical news content events and the news story incident; and driving the graphical user interface display device to plot a time line curve with respect to a horizontal axis and a vertical axis from a point of origin at the location of the initial event indicated on the map of geographic locations as a function of a relation over time of the total numbers of the historical news content stories to their respective times of publication, wherein a first axis of the horizontal axis and the vertical axis comprises a range of time values that comprises values of the different times of publication of each of the retrieved historical news content stories and that is initialized to zero at the point of origin at the location of the initial event, and wherein a second axis of the horizontal axis and the vertical axis comprises a range of values of total numbers of new content stories that comprises values of the total numbers of the historical news content stories with respect to each of the different times of publication of the historical news content stories and is initialized with the time of the initial event at the point of origin location of the initial event, and wherein the first axis is different from the second axis.

2. The method of claim 1, further comprising:
driving the graphical user interface display device to project an interactive topic hyperlink from the plotted time line curve at a point of a time of occurrence of a linked one of the historical news content events, wherein the interactive topic hyperlink comprises a text description of the linked one of the historical news content events; and
wherein selection of the interactive topic hyperlink via a graphical user interface routine input triggers a presentation of news story content from the retrieved historical news content that is associated with the linked one of the historical news content events.

3. The method of claim 2, further comprising:
driving the graphical user interface display device to indicate on the map a geographic location of the linked one of the historical news content events, wherein the indicated geographic location of the linked one of the historical news content events is linked to the interactive topic hyperlink of the linked one of the historical news content events.

4. The method of claim 2, wherein the key perspective topic of the news story incident is selected from the group consisting of an impacted group of people, and a severity of the news story incident event from an economics perspective at a geographical or a political entity level.

5. The method of claim 2, wherein the presentation of news story content from the retrieved historical news content that is associated with the linked one of the historical news content events comprises content selected from the group consisting of image objects, spoken word content and sound content.

6. The method of claim 2, further comprising:
integrating computer-readable program code into a computer system comprising the computer processor, a computer readable memory in circuit communication with the computer processor, and a computer readable storage medium in circuit communication with the computer processor; and
wherein the computer processor executes program code instructions stored on the computer-readable storage medium via the computer readable memory and thereby performs the identifying the key perspective topic of the news story and the geographic location and time of the incident occurrence, the searching for and retrieving the plurality of historical news content stories and context data, the determining the plurality of total numbers of the historical news content stories with respect to each of the plurality of different times of publication of the respective historical news content stories, and the driving the graphical user interface display device to indicate on the map the location of the initial event and to plot the time line curve with respect to the horizontal axis and the vertical axis.

7. The invention of claim 6, wherein the computer-readable program code is provided as a service in a cloud environment.

8. A system, comprising:
a processor;
a computer readable memory in circuit communication with the processor; and
a computer readable storage medium in circuit communication with the processor; wherein the processor executes program instructions stored on the computer-readable storage medium via the computer readable memory and thereby:

in response to a selection of a news story, identifies a key perspective topic of the news story, a geographic location of an occurrence of an incident of the news story, and a time of the incident occurrence;
searches for and retrieves from at least one news media source a plurality of historical news content stories as a function of each of the retrieved historical content news stories comprising the key perspective topic and an association with the incident geographic location and the incident occurrence time, and wherein the retrieved historical content comprises context data that comprises times of publication of each of the retrieved stories and geographic location data of occurrences of events within the retrieved historical content;
determines a plurality of total numbers of the historical news content stories with respect to each of plurality of different times of publication of the respective historical news content stories;
drives a graphical user interface display device in communication with the processor to indicate on a map of geographic locations a location of an initial event of the historical news content that has an earliest time of occurrence relative to occurrence times of others of the historical news content events and the news story incident; and
drives the graphical user interface display device to plot a time line curve with respect to a horizontal axis and a vertical axis from a point of origin at the location of the initial event indicated on the map of geographic locations as a function of a relation over time of the total numbers of the historical news content stories to their respective times of publication, wherein a first axis of the horizontal axis and the vertical axis comprises a range of time values that comprises values of the different times of publication of each of the retrieved historical news content stories and that is initialized to zero at the point of origin at the location of the initial event, and wherein a second axis of the horizontal axis and the vertical axis comprises a range of values of total numbers of new content stories that comprises values of the total numbers of the historical news content stories with respect to each of the different times of publication of the historical news content stories and is initialized with the time of the initial event at the point of origin location of the initial event, and wherein the first axis is different from the second axis.

9. The system of claim 8, wherein the processor executes the program instructions stored on the computer-readable storage medium via the computer readable memory and thereby:
drives the graphical user interface display device to project an interactive topic hyperlink from the plotted time line curve at a point of a time of occurrence of a linked one of the historical news content events, wherein the interactive topic hyperlink comprises a text description of the linked one of the historical news content events; and
wherein selection of the interactive topic hyperlink via a graphical user interface routine input causes the processor to trigger a presentation of news story content from the retrieved historical news content that is associated with the linked one of the historical news content events.

10. The system of claim 9, wherein the processor executes the program instructions stored on the computer-readable storage medium via the computer readable memory and thereby drives the graphical user interface display device to indicate on the map a geographic location of the linked one of the historical news content events, wherein the indicated geographic location of the linked one of the historical news content events is linked to the interactive topic hyperlink of the linked one of the historical news content events.

11. The system of claim 9, wherein the key perspective topic of the news story incident is selected from the group consisting of an impacted group of people, and a severity of the news story incident event from an economics perspective at a geographical or a political entity level.

12. The system of claim 9, wherein the processor executes the program instructions stored on the computer-readable storage medium via the computer readable memory and thereby extracts data components of information from each retrieved data content file via content analysis by extracting content selected from the group consisting of image objects, spoken word content and sound content.

13. The system of claim 9, wherein the processor executes the program instructions stored on the computer-readable storage medium via the computer readable memory and thereby, in response to a selection input of the user via the graphical user interface, executes an action that is selected from the group consisting of:
- advances a story of the summarized analyzed historical content;
- traverses key events of the story of the summarized analyzed historical content; and
- gets additional detail of the story of the summarized analyzed historical content that comprises data components of information content extracted from each retrieved data content file via the performing the content analysis.

14. The system of claim 9, wherein the program instructions stored on the computer-readable storage medium are provided as a service in a cloud environment.

15. A computer program product for generating an interactive plotted electronic map presentation which depicts historical progression of events of a news story, the computer program product comprising:
- a computer readable storage medium having computer readable program code embodied therewith, wherein the computer readable storage medium is not a transitory signal per se, the computer readable program code comprising instructions for execution by a processor that cause the processor to:
- in response to a selection of a news story, identify a key perspective topic of the news story, a geographic location of an occurrence of an incident of the news story, and a time of the incident occurrence;
- search for and retrieve from at least one news media source a plurality of historical news content stories as a function of each of the retrieved historical content news stories comprising the key perspective topic and an association with the incident geographic location and the incident occurrence time, and wherein the retrieved historical content comprises context data that comprises times of publication of each of the retrieved stories and geographic location data of occurrences of events within the retrieved historical content;
- determine a plurality of total numbers of the historical news content stories with respect to each of plurality of different times of publication of the respective historical news content stories;
- drive a graphical user interface display device in communication with the processor to indicate on a map of geographic locations a location of an initial event of the historical news content that has an earliest time of occurrence relative to occurrence times of others of the historical news content events and the news story incident; and
- drive the graphical user interface display device to plot a time line curve with respect to a horizontal axis and a vertical axis from a point of origin at the location of the initial event indicated on the map of geographic locations as a function of a relation over time of the total numbers of the historical news content stories to their respective times of publication, wherein a first axis of the horizontal axis and the vertical axis comprises a range of time values that comprises values of the different times of publication of each of the retrieved historical news content stories and that is initialized to zero at the point of origin at the location of the initial event, and wherein a second axis of the horizontal axis and the vertical axis comprises a range of values of total numbers of new content stories that comprises values of the total numbers of the historical news content stories with respect to each of the different times of publication of the historical news content stories and is initialized with the time of the initial event at the point of origin location of the initial event, and wherein the first axis is different from the second axis.

16. The computer program product of claim 15, wherein the computer readable program code instructions for execution by the processor further cause the processor to drive the graphical user interface display device to project an interactive topic hyperlink from the plotted time line curve at a point of a time of occurrence of a linked one of the historical news content events, wherein the interactive topic hyperlink comprises a text description of the linked one of the historical news content events; and
- wherein selection of the interactive topic hyperlink via a graphical user interface routine input causes the processor to trigger a presentation of news story content from the retrieved historical news content that is associated with the linked one of the historical news content events.

17. The computer program product of claim 16, wherein the computer readable program code instructions for execution by the processor further cause the processor to drive the graphical user interface display device to indicate on the map a geographic location of the linked one of the historical news content events, wherein the indicated geographic location of the linked one of the historical news content events is linked to the interactive topic hyperlink of the linked one of the historical news content events.

18. The computer program product of claim 16, wherein the key perspective topic of the news story incident is selected from the group consisting of an impacted group of people, and a severity of the news story incident event from an economics perspective at a geographical or a political entity level.

19. The computer program product of claim 16, wherein the computer readable program code instructions for execution by the processor further cause the processor to extract data components of information from each retrieved data content file via content analysis by extracting content selected from the group consisting of image objects, spoken word content and sound content.

20. The computer program product of claim 16, wherein the program instructions stored on the computer-readable storage medium are provided as a service in a cloud environment.

* * * * *